March 10, 1942.  L. A. GENETTI ET AL  2,275,750
MULTIPURPOSE WATER DISTRIBUTION DEVICE
Filed Sept. 28, 1939    2 Sheets-Sheet 2
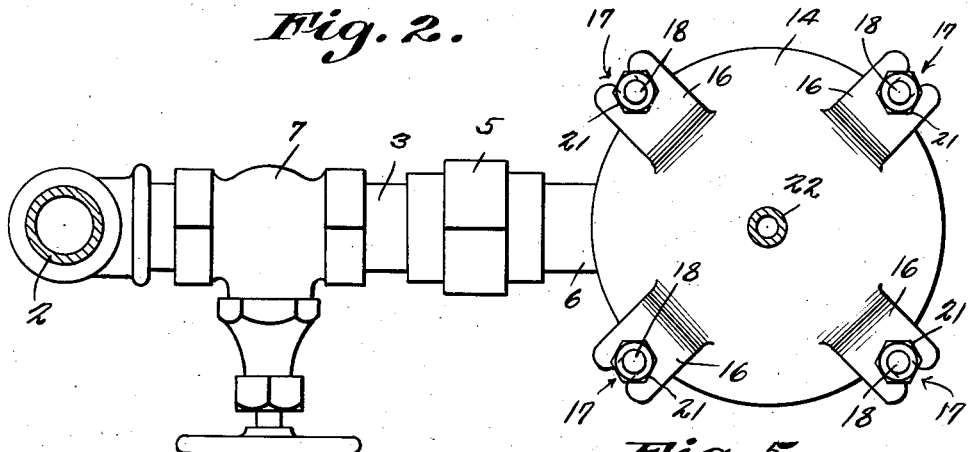
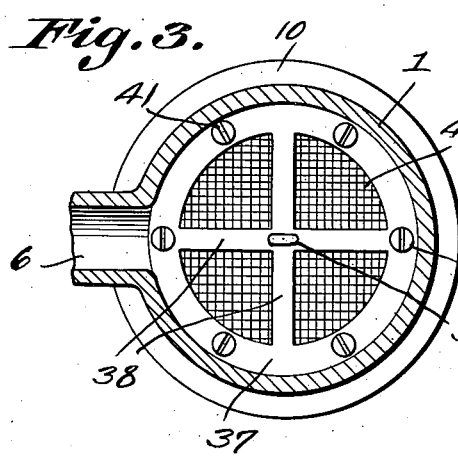
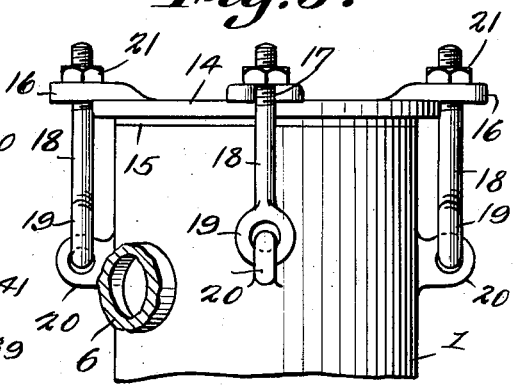
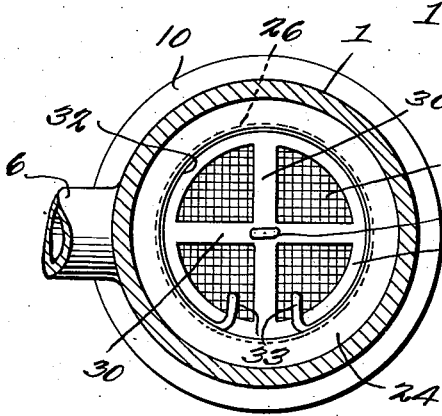
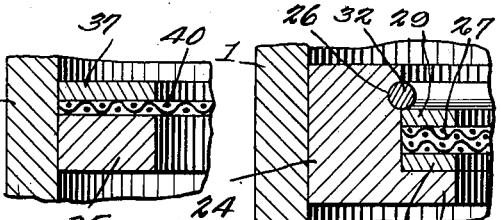
L. A. Genetti
A. A. Drumm
INVENTORS.
BY
ATTORNEYS.

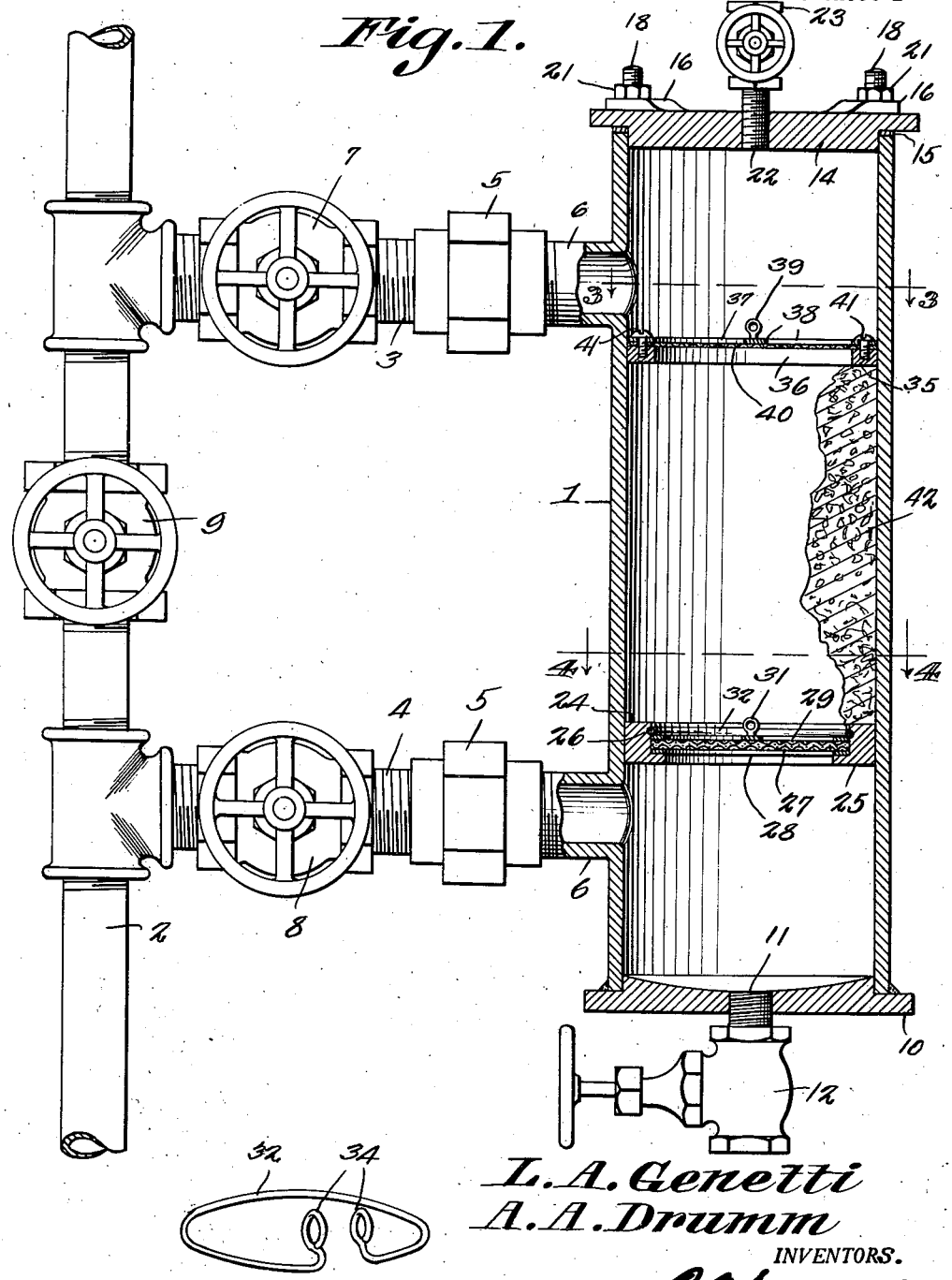

Patented Mar. 10, 1942

2,275,750

UNITED STATES PATENT OFFICE 2,275,750

MULTIPURPOSE WATER DISTRIBUTION DEVICE

Leon A. Genetti and Andrew A. Drumm, Hazleton, Pa.

Application September 28, 1939, Serial No. 296,990

1 Claim. (Cl. 210—131)

This invention aims to provide a simple means for filtering water, and particularly water which is used for domestic purposes. The invention aims to supply a simple but effective combination of parts whereby water may be filtered, whereby the filter structure may be washed out, and whereby the water supply pipe can be cleaned and then flushed free of the chemical used for cleaning.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in elevation, a device constructed in accordance with the invention, the filter casing and associated parts appearing in vertical section;

Fig. 2 is a top plan;

Fig. 3 is a cross section on the line 3—3 of Fig. 1;

Fig. 4 is a cross section on the line 4—4 of Fig. 1;

Fig. 5 is a side elevation of the filter casing, parts being broken away and a part appearing in section;

Fig. 6 is a vertical section showing a portion of the upper screen structure;

Fig. 7 is a vertical section showing a portion of the lower screen structure;

Fig. 8 is a perspective disclosing the holding ring which constitutes a part for retaining the lower screen structure in place removably.

In carrying out the invention, there is provided a vertical, cylindrical filter casing 1, and alongside the filter casing is disposed a vertical water pipe 2, through which water is delivered to the places of use. The water pipe 1 has a horizontal branch 3, which may be called an upper branch, and a horizontal lower branch 4, the branches 3 and 4 being detachably assembled, by means of couplings 5, with lateral nipples 6 on the casing 1, the nipples being disposed adjacent to the upper and lower ends of the casing, respectively.

A valve 7 is interposed in the branch 3, a valve 8 is interposed in the branch 4, and a valve 9 is interposed in the pipe 2, between the branches 3 and 4. The valves 7, 8 and 9 are under the control of an operator, and may be of any preferred construction.

A foot 10 is fixed on the lower end of the casing 1, and is provided with a drain outlet 11, under the governance of a valve 12 that may be controlled by an operator. The tubular casing 1 is surmounted by a removable head 14, a packing gasket 15 being inserted between the head and the upper end of the casing 1. The head 14 is supplied with outstanding ears 16 having end notches 17, adapted to receive clamping devices, for instance swing bolts 18, permanently pivoted at their lower ends, as shown at 19, in outstanding lugs 20 on the casing 1. Nuts 21 are threaded on the swing bolts 18, and cooperate with the ears 16 of the head 14, to hold the head tightly in place. The head 14 is provided with an inlet 22, for a liquid chemical, the inlet being controlled by a valve 23 which, ordinarily, is closed.

A lower annular seat 24 is secured in the casing 1, a little above the branch 4 of the water pipe 2. It is shown in Fig. 7 that, at its lower end, the seat 24 is supplied with an inwardly projecting, annular shoulder 25. An internal circumferential groove 26 is formed in the seat 24, in vertically spaced relation to the shoulder 25.

A lower screen structure is provided, and comprises superposed layers of netting 27, disposed between and secured to a lower ring 28 and an upper ring 29, the rings and the netting forming a unitary structure. As disclosed in Fig. 4, the upper ring 29 has diametrically disposed reinforcing cross pieces 30, arranged at right angles to each other, and provided at their place of crossing with a lifting eye 31. The lower screen structure 29—27—28 rests on the shoulder 25 of the lower seat 24.

For the retention of the lower screen structure 28—27—29 in place, there is provided a resiliently-expansible, ring-shaped retainer, shown in Fig. 8, and marked by the numeral 32. At its ends, the retainer 32 is furnished with upstanding arms 33, terminated in loop-shaped finger pieces 34. The retainer 32 can be contracted by pressing the finger pieces 34 together, and when the retainer is permitted to expand in the annular groove 26 of the shoulder 25, the retainer, overhanging and engaging the ring 29, as shown in Fig. 7, will hold the lower screen structure 28—27—29 securely but removably in place.

An upper, annular seat 35 (Fig. 6) is secured in the casing 1, slightly below the upper branch 3 of the water pipe 2. An upper screen structure is provided, and includes a layer 40 of netting, secured to the lower surface of a ring 37, the screen structure being supported on the seat 35. The ring 37 is provided with cross pieces 38, constructed like the cross pieces 30 of the ring 29, the cross pieces 38 having, at their place of crossing, a lifting eye 39. Securing elements 41, such as screws, attach the upper screen structure 37—40 to the seat 35, removably.

In order to prepare the device for use, close the valves 7 and 8, to cut off the water supply, take off the head 14, and open the valve 12, so that the casing 1 can drain. Close the valve 12. Remove the screws 41 and lift out the upper screen structure 37—40. Fill the space above the lower screen structure 27—28—29 with charcoal 42 or other filtering material, up to the seat 35. Replace the screen structure 37—40. Replace and fasten the head 14, the valve 23 being closed. Close the valve 9 to prevent direct flow through the water pipe 2. Open the valves 7 and 8, to permit the water to by-pass through the filter casing 1.

If filtered water is not wanted, close the valves 7 and 8, and open the valve 9. To wash out the filter, close the valve 8, open the valves 9 and 7, and open the drain valve 12.

To clean the water pipe 2, close the valves 8 and 9, and open the drain valve 12. Open all faucets in the upper part of the pipe 2, to afford a vent. Close the faucets (not shown) when the water stops running at the drain valve 12. Close the drain valve 12. Take off the head 14. Lift out the upper screen structure 37—40. Slack away the couplings 5, to free the casing 1. Invert the casing 1 and dump out the charcoal shown at 42. Put the device together and couple it up, the charcoal being replaced by bicarbonate of soda or some other suitable chemical. Close the valve 9. Open the valve 7. Open the valve 8 a little, so that a small stream of water will flow from the lower part of the pipe 2 through the branch 4, through the soda in the casing 1, through the branch 3, and through the upper part of the pipe 2. Open all faucets (not shown) in the upper part of the pipe 2, until they discharge treated water. Close the faucets and let the treated water stand for three hours or so.

Open the valves 7 and 8 completely. Open all faucets in the pipe 2 full-head, to flush out the pipe. Close the faucets, recharge the casing 1 with charcoal, and the device again is ready for use as a filter. In the event that it is desired to use a liquid, instead of soda, to clean out the pipe 2, the liquid can be admitted to the casing 1, through the valve 23.

It is to be noted that the opening 36 in the upper annular seat 35 is sufficiently large in diameter so that the lower screen structure 29—27—28 can be lowered to place on the shoulder 25 of the lower seat 24, through the opening 36, a hook (not shown) being engaged with the eye 31. When the screws 41 are removed and when the head 14 is taken off, the upper screen structure 37—40 can be lifted out in a similar manner.

The device, preferably, is made of metal throughout, saving as otherwise specified. The device functions as a filter, a means is provided whereby the filter can be washed out, and the water supply pipe 2 can be cleaned. Through the instrumentality of a very simple structure, the device accomplishes three major purposes. The mechanism requires but infrequent attention and does not call for skilled labor in any of its operations. The device will segregate impurities from water which, to the casual observer, appears to be of high grade, and, of course, it is impossible for large and visible foreign matter to pass through the filter structure.

Having thus described the invention, what is claimed is:

In a device for filtering water which flows through a conduit, washing a filtering instrumentality, and cleaning the conduit: a casing, a head supported on the upper end of the casing, a water supply pipe having branches communicating with the casing, adjacent to the upper and lower ends thereof, one-way valves in the branches, a one-way valve in the pipe and located between the branches, a drain communicating with the lower portion of the casing, a valve governing the drain, all of the valves being under the control of an operator, a lower seat fixed in the casing, a lower screen supported by the lower seat, an expansion ring within the lower seat and retaining the lower screen, an upper screen removably mounted in the casing, filtering material between the screens and constituting assisting means for holding the ring extended: means for securing the head to the casing removably and couplings in the branches, whereby the casing may be detached from the branches and inverted, to remove the filtering material and permit the substitution of a cleaning agent, an inlet for cleaning liquid, carried by the head, and a valve carried by the inlet and controlling the flow of cleaning liquid.

LEON A. GENETTI.
ANDREW A. DRUMM.